(12) United States Patent
Huang et al.

(10) Patent No.: US 12,525,631 B2
(45) Date of Patent: Jan. 13, 2026

(54) REDOX DEVICE OF A METAL-AIR FLOW BATTERY

(71) Applicant: Talent Innovative Circular Energy Technology Co. Ltd., Taipei (TW)

(72) Inventors: Kuohsiu David Huang, Taipei (TW); Wen-Huang Liao, Taipei (TW)

(73) Assignee: Talent Innovative Circular Energy Technology Co., Ltd., Taipei (TW)

( * ) Notice: Subject to any disclaimer, the term of this patent is extended or adjusted under 35 U.S.C. 154(b) by 545 days.

(21) Appl. No.: 18/164,549

(22) Filed: Feb. 3, 2023

(65) Prior Publication Data

US 2024/0170702 A1     May 23, 2024

(30) Foreign Application Priority Data

Nov. 3, 2022   (TW) .................................. 111142001

(51) Int. Cl.
*H01M 8/06*      (2016.01)
*H01M 8/18*      (2006.01)
*H01M 12/08*     (2006.01)

(52) U.S. Cl.
CPC ......... *H01M 8/0693* (2013.01); *H01M 8/188* (2013.01); *H01M 12/08* (2013.01)

(58) Field of Classification Search
None
See application file for complete search history.

(56) References Cited

U.S. PATENT DOCUMENTS

| | | | |
|---|---|---|---|
| 2013/0049694 A1* | 2/2013 | Friesen | H01M 4/12 320/128 |
| 2014/0272483 A1* | 9/2014 | Pham | H01M 8/04186 429/51 |
| 2018/0342753 A1* | 11/2018 | Nakajima | H01M 8/04201 |
| 2019/0218678 A1* | 7/2019 | Fan | C25C 7/08 |

FOREIGN PATENT DOCUMENTS

| | | |
|---|---|---|
| CN | 201048155 | 4/2008 |
| CN | 104985580 | 10/2015 |
| CN | 110820018 | 2/2020 |

OTHER PUBLICATIONS

"Notice of allowance of Taiwan Counterpart Application", issued on Oct. 16, 2023, p. 1-p. 4.

* cited by examiner

*Primary Examiner* — Scott J. Chmielecki
(74) *Attorney, Agent, or Firm* — JCIPRNET

(57) ABSTRACT

A redox device of a metal-air flow battery includes a container, a rod inserted into and electrically insulated from the container, a net connected to and surrounding the rod, a power supply, and an ultrasonic module. The container, the rod, and the net are electrically conductive, respectively. The net moves away from the rod gradually in a spiral manner. The container receives an electrolyte solution containing a product originated from the metal-air flow battery. The net is immersed in the electrolyte solution. The power supply is electrically connected to the container, the rod, and the net to form an electric loop via the electrolyte solution. The power supply provides a pulse current to the electric loop to electrochemically deposit metal from the electrolyte solution on the net. The ultrasonic module provides vibrations to the container to shake off metal from the net and suspend the metal in the electrolyte solution.

11 Claims, 5 Drawing Sheets

REDOX DEVICE OF A METAL-AIR FLOW BATTERY

CROSS-REFERENCE TO RELATED APPLICATION

This application claims the priority benefit of Taiwan application serial no. 111142001, filed on Nov. 3, 2022. The entirety of the above-mentioned patent application is hereby incorporated by reference herein and made a part of this specification.

TECHNICAL FIELD

The disclosure relates to a redox device and particularly relates to a redox device of a metal fuel flow battery.

DESCRIPTION OF RELATED ART

After the industrial revolution, fossil fuels have become the main energy source for human beings, while petrochemical energy will be exhausted eventually, and countries around the world will inevitably face the impact of high oil prices resulting from the reduction of petrochemical production capacity in the future. Hence, how to alleviate dependence on the fossil fuels and properly utilize the limited energy resources has become one of the important issues in the energy policies of countries around the world. In addition, with the rise of environmental awareness and the pursuit of sustainable development in recent years, countries are constantly looking for and developing energy sources with high performance and low pollution, among which metal fuel batteries with high mass specific energy and volumetric specific energy are one of the main energy sources which have been developing.

Among the metal fuel batteries, zinc fuel batteries have received special attention because zinc is relatively stable in an aqueous solution and alkaline electrolyte. However, most of the zinc air batteries on the market are disposable consumables. Although some manufacturers reduce zinc oxide particles from the electrolyte solutions in the used zinc air batteries and apply the reduced particles as the raw material of the zinc air batteries, how to efficiently collect the zinc attached to a cathode conductive bar for reuse is still a major challenge at present.

SUMMARY

The disclosure relates to a redox device of a metal-air flow battery to effectively reduce an electrolyte solution used in the battery and obtain required metal fuel for recycling.

An embodiment of the disclosure provides a redox device of a metal-air flow battery configured to reduce a product of the metal-air flow battery to meta. The redox device includes a container, a rod, a net, a power supply, and an ultrasonic module. The container, the rod, and the net are electrically conductive, respectively. The rod is inserted into the container and electrically insulated from the container. The net is connected to the rod and separated from the container, and the net surrounding the rod gradually moves away from the rod in a spiral manner. The container receives an electrolyte solution containing the product originated from the metal-air flow battery, and the net is immersed in the electrolyte solution. The power supply is electrically connected to the rod, the net, and the container to form an electric loop via the electrolyte solution, where the container is connected to a negative electrode of the power supply, and the rod is connected to a positive electrode of the power supply. The ultrasonic module is connected to the container and provides an ultrasonic vibration to the container, where the power supply provides a pulse current to the electric loop, so that the metal is electrochemically deposited from the electrolyte solution containing the product on the net, and during the electrochemical deposition, the metal is shaken off from the net via the ultrasonic vibration and suspended in the electrolyte solution.

In an embodiment of the disclosure, the net covers a surface of the rod.

In an embodiment of the disclosure, a material of the rod includes tough pitch copper.

In an embodiment of the disclosure, a material of the net includes a corrosion-resistant flexible electrical conductor.

In an embodiment of the disclosure, the redox device further includes a control module electrically connected to the power supply and the ultrasonic module.

In an embodiment of the disclosure, the control module controls the ultrasonic module to be intermittently turned on and off.

In an embodiment of the disclosure, the redox device further includes a pump connected to the container to collect a gas generated during the electrochemical deposition.

In an embodiment of the disclosure, a concentration of the electrolyte solution is less than 50 wt %, and a temperature of the electrolyte solution is lower than 50° C.

In an embodiment of the disclosure, the redox device is configured to connect the metal-air flow battery to form a charging/discharging system. The redox device collects the electrolyte solution containing the product from the metal-air flow battery after a discharging reaction, and the redox device generates the metal via the electrochemical deposition and suspends the metal in the electrolyte solution, so that the suspended metal is transferred back to the metal-air flow battery together with the electrolyte solution.

In an embodiment of the disclosure, the redox device further includes a storage bucket connected between the metal-air flow battery and the redox device.

In an embodiment of the disclosure, the redox device and the metal-air flow battery are both airtight devices, so as to transform the electrolyte solution into a circulating fluid via a negative voltage.

In view of the above, the rod, the container, and the net are correspondingly disposed in the redox device, and the power supply supplies power to the container and the rod, so as to form the electric loop via the electrolyte solution. Thereby, an oxidation-reduction reaction may be performed in the container on the electrolyte solution containing the product of the metal-air battery, and metal is further electrochemically deposited on the net. What is more, during the electrochemical deposition, the ultrasonic module provides the vibration to the container, so as to shake off metal particles deposited on the net and suspend the metal particles in the electrolyte solution, so as to obtain the metal fuel that is recycled and is to be used by the discharging device.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
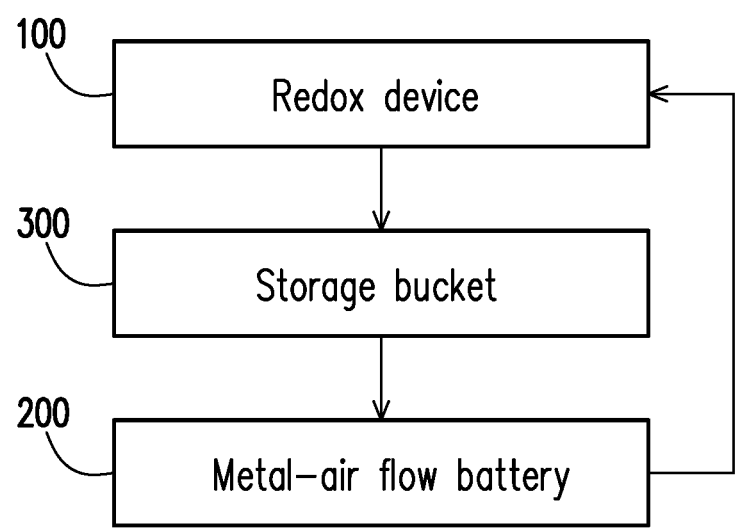
FIG. 1 is a schematic block view of a charging/discharging system according to an embodiment of the disclosure.
Figure 2A:
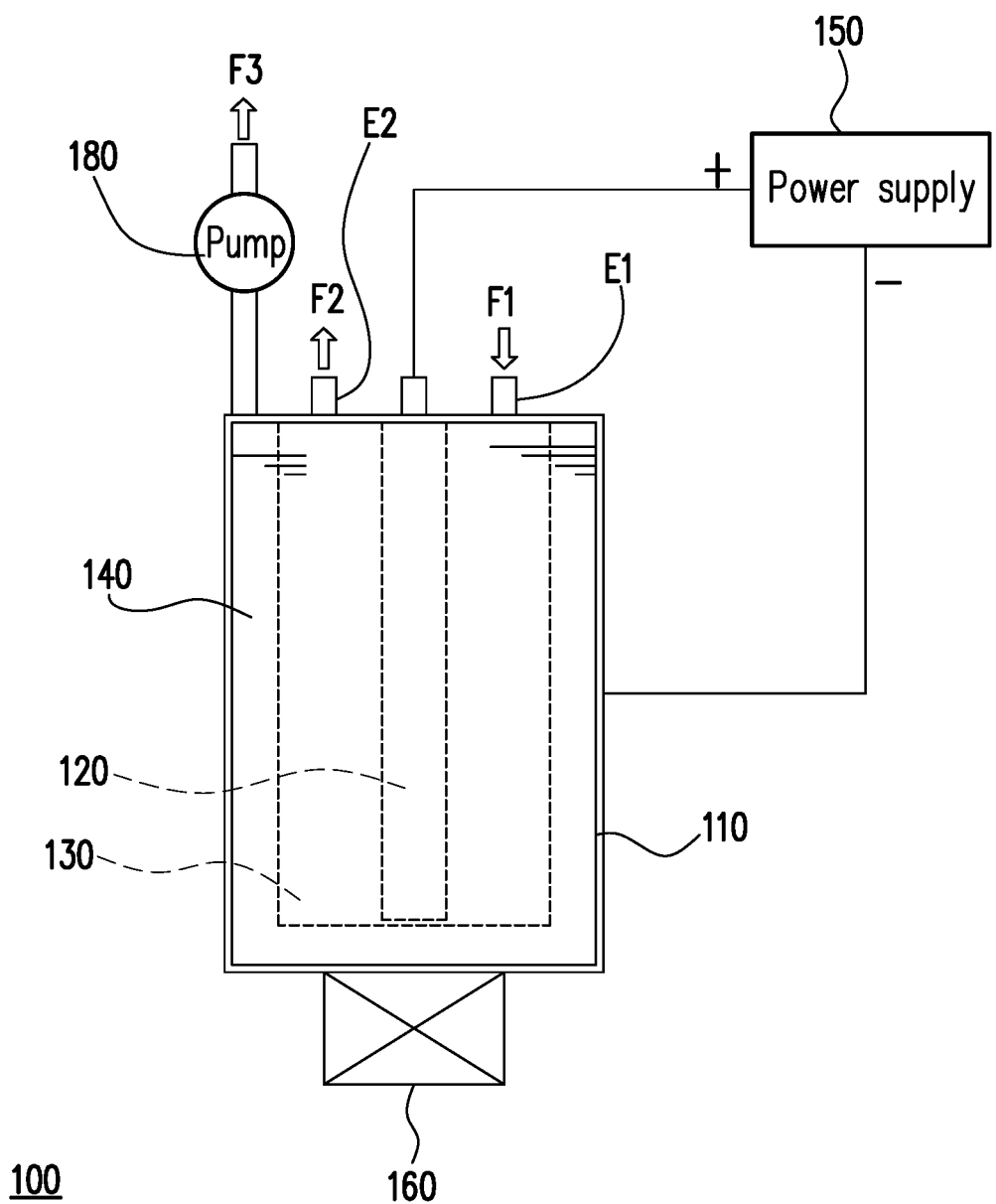
FIG. 2A is a schematic view of a redox device according to an embodiment of the disclosure.

FIG. 1 is a schematic block view of a charging/discharging system according to an embodiment of the disclosure. FIG. 2A is a schematic view of a redox device according to an embodiment of the disclosure. With reference to FIG. 1 and FIG. 2A, in this embodiment, a charging/discharging system of a metal-air flow battery (hereinafter referred to as a charging/discharging system 10) includes a redox device 100, a storage bucket 300, and a metal-air flow battery 200, where a product generated due to a discharging reaction in the metal-air flow battery 200 includes a final product: metal oxide, an intermediate product: metal hydroxide ion, or both, and the product are adapted to be transferred from the metal-air flow battery 200 to the redox device 100, so as to perform a reduction-oxidation reaction to generate metal, and the product is stored in a storage bucket 300 in advance along with an electrolyte solution to subsequently replenish the metal-air flow battery 200.

Certainly, in other embodiments, the above-mentioned processes (in the redox device 100, the storage bucket 300, and the metal-air flow battery 200) may also be carried out individually and are not limited to be performed simultaneously.

Figure 2B:
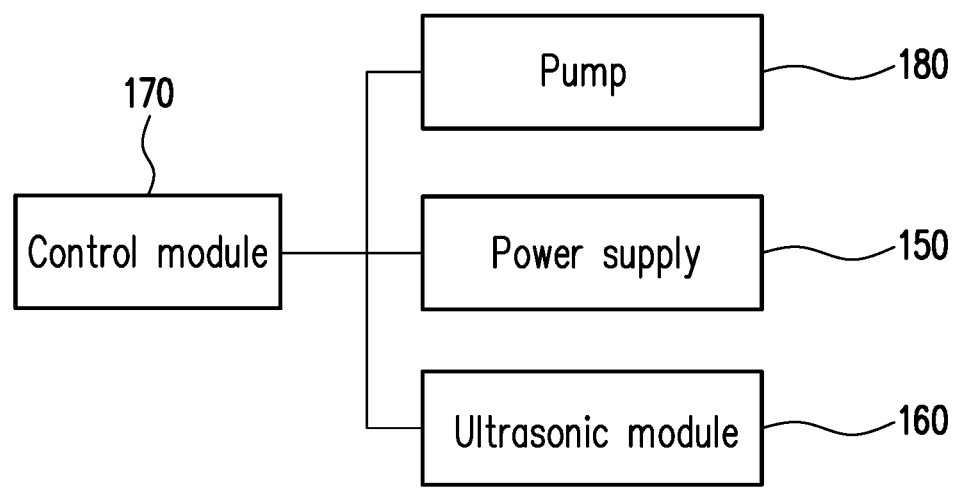
FIG. 2B illustrates an electrical connection relationship of relevant components according to an embodiment of the disclosure.
Figure 3A:
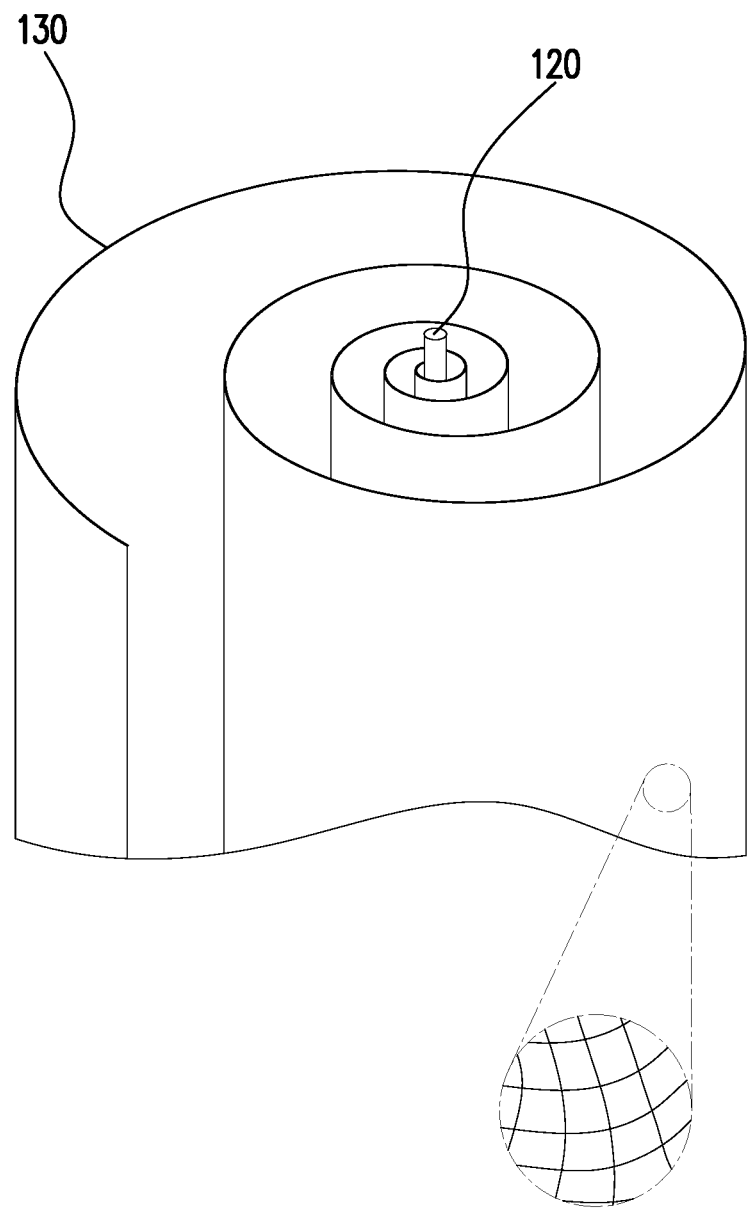
FIG. 3A is a partial three-dimensional view of a rod and a net according to an embodiment of the disclosure.
Figure 3B:
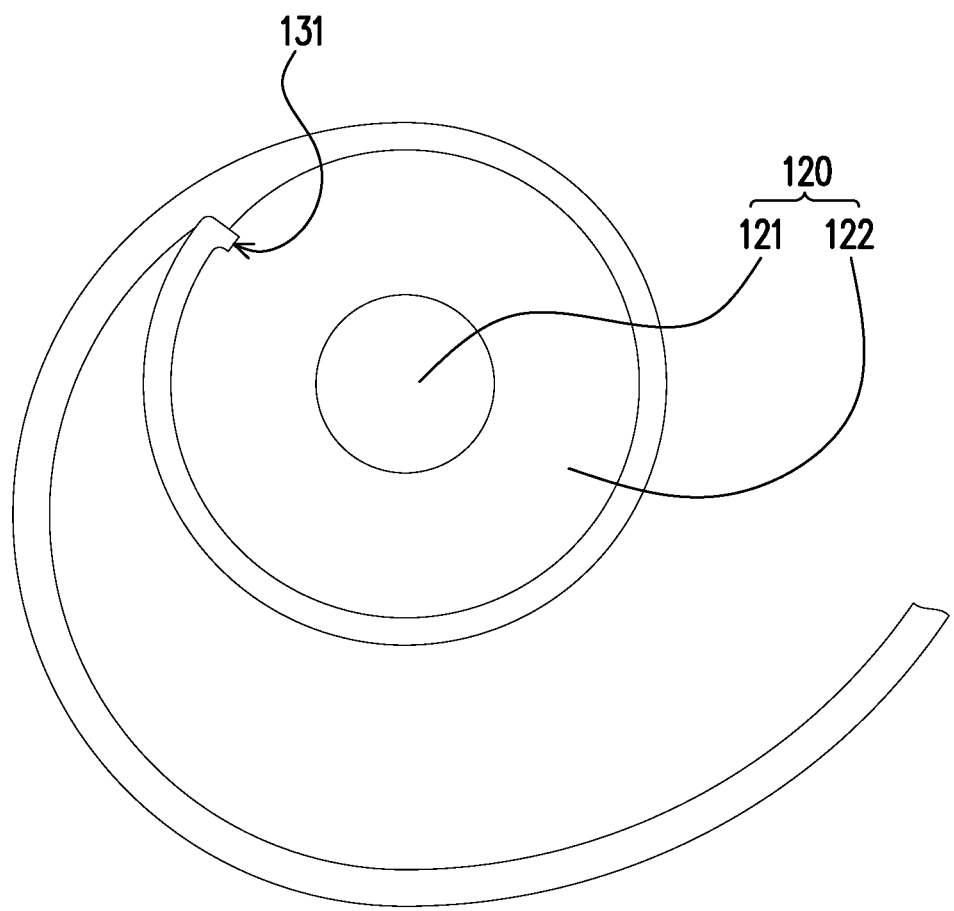
FIG. 3B is a partial top view of a rod and a net according to an embodiment of the disclosure.

FIG. 2B illustrates an electrical connection relationship of relevant components according to an embodiment of the disclosure. FIG. 3A is a partial three-dimensional view of a rod and a net according to an embodiment of the disclosure. FIG. 3B is a partial top view of a rod and a net according to an embodiment of the disclosure. With reference to FIG. 2A, FIG. 2B, and FIG. 3A, in this embodiment, the redox device 100 includes a container 110, a rod 120, a net 130, a power supply 150, and an ultrasonic module 160. The container 110, the rod 120, and the net 130 are respectively electrically conductive. The rod 120 is inserted into and electrically insulated from the container 110. The net 130 is connected to the rod 120 and separated from the container 110 (to prevent short circuit after the power is on subsequently). The net 130 surrounding the rod 120 moves away from the rod 120 gradually in a spiral manner centered. The container 110 receives an electrolyte solution 140 containing the product originated from the metal-air flow battery 200, and the net 130 is immersed in the electrolyte solution 140. The power supply 150 is connected to the rod 120, the net 130, and the container 110 to form an electric loop via the electrolyte solution 140, where the container 110 is connected to a negative electrode of the power supply 150, and the rod 120 is connected to a positive electrode of the power supply 150. The ultrasonic module 160 connects and provides an ultrasonic vibration to the container 110, where the power supply 150 provides a pulse current to the electric loop, so as to electrochemically deposit metal from the electrolyte solution 140 containing the product on the net 130. During the electrochemical deposition, the metal is suspended in the electrolyte solution 140 via the continuous ultrasonic vibration.

A zinc-air flow battery is taken as an example, and a potassium hydroxide (KOH) solution is chosen as the electrolyte solution 140, whereby a discharging reaction is represented by the following equation (and its voltage value):

A half-reaction equation at a metal zinc anode is:

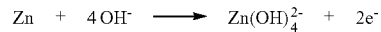

$E0 = -1.21V$

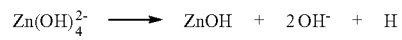

A half-reaction equation at a cathode at an air end is:

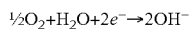

$E0 = 0.401V$

The full-reaction equation of the zinc-air flow battery may be obtained by combining said equations:

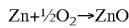

$E0 = 1.6V$

In the above reaction process, after the reaction between metal zinc and the hydroxide ion, electric charges are released, and resultant zinc hydroxide ion $Zn(OH)2-4$ is dissolved in the KOH solution. As long as the concentration reaches a saturated state, zinc oxide (ZnO) starts to be generated. Hence, the composition flowing into the redox device 100 includes the ZnO (the metal oxide), the zinc hydroxide ion (the metal hydroxide ion), and the KOH solution, which serves as the composition of the electrolyte solution 140 shown in FIG. 2A.

It is not necessary to repetitively describe the chemical equation of the reduction-oxidation reaction in the redox device 100 shown in FIG. 2A. However, according to the related art, dendritic metal (zinc) is very much likely to be grown on a surface of an electrode in said process and thus cannot be evenly attached to the surface of the anode, which further results in an issue that the electric capacity cannot be effectively improved. The reason behind the issue lies in a polarization phenomenon of the zinc fuel battery, including concentration polarization, activation polarization, and ohmic polarization, which leads to an increase in an internal resistance of the electrochemical battery. Accordingly, as shown in FIG. 2A, the metal recycled to the metal-air flow battery 200 may be well collected through the control of the ultrasonic module 160 and related conditions. Detailed descriptions are provided below.

With reference to FIG. 2A and FIG. 2B, in this embodiment, the redox device 100 further includes a control module 170 which is electrically connected to the power supply 150 and the ultrasonic module 160 and accordingly adjusts relevant parameters during the electrochemical deposition, so as to obtain metal particles with a particle size less than 100 microns, and the metal may be suspended in the electrolyte solution 140 and thus may be easily transferred out of the redox device 100. Here, the control module 170 controls the ultrasonic module 160 to be intermittently turned on and off.

In addition to the above conditions, with use of the electrolyte solution 140 having a concentration less than 50 wt % and a temperature lower than 50° C., the redox device 100 is able to collect the electrolyte solution 140 containing the product originated from the metal-air flow battery 200 after the discharging reaction is performed and generate the metal via the electrochemical deposition, so that the metal is suspended in the electrolyte solution 140 and may be transferred back to the metal-air flow battery 200 together with the electrolyte solution 140. As shown in FIG. 1, after the reduction reaction, the destination to which the electrolyte solution and the suspended metal therein are transferred is not limited in this disclosure; namely, the electrolyte solution and the suspended metal therein may be directly transferred back to the metal-air flow battery 200 as described above or may be stored in the storage bucket 300 as shown in FIG. 1.

With reference to FIG. 3A and FIG. 3B and in comparison with FIG. 2, in this embodiment, a material of the rod 120 includes a tough pitch copper, and a material of the net 130 includes a corrosion-resistant flexible electrical conductor, such as nickel alloy. The rod 120 is electrically connected between the positive electrode of the power supply 150 and the net 130. Here, the rod 120 serves as the connection of the electric loop, so as to facilitate the passage of a relatively large current without burning out and melting the net 130. Furthermore, in order to improve the precipitation efficiency (and the quantity) of the resultant metal, according to the present embodiment, a surface of the rod 120 is covered by the net 130, and then the net 130 surrounding the rod 120 moves away from the rod 120 gradually in a spiral manner. That is, one side of the net 130 is embedded to the surface of the rod 120, and the other side of the net 130 covering the surface of the rod 120 gradually moves away from the rod 120 in a spiral manner. Here, the corrosion degree of the rod 120 by the electrolyte solution 140 may be reduced because the surface of the rod 120 is covered by the net 130. It should also be noted that the net 130 is located in the container 110 and is immersed in the electrolyte solution 140, and thus it is necessary to keep a distance between the net 130 and an inner wall of the container 110 to avoid short circuit during power supply. In this embodiment, the mesh number of the net 130 is tens to hundreds, so as to ensure a sufficient contact area between the net 130 and the electrolyte solution 140 and maintain the maximum current that may pass the net 130.

In addition, the rod 120 includes a portion 121 with a smaller outer diameter and a portion 122 with a larger outer diameter, wherein the portion 121 is embedded in the container 110 and electrically connected to the power supply 150, and the portion 121 is required to be electrically insulated from the container 110. The net 130 covers the surface of the portion 122 of the rod 120, so that the rod 120 and the net 130 become the cathode in the reduction-oxidation reaction, which allows a relatively large current to be transferred to the net 130 through the rod 120. Correspondingly, the container 110 becomes the anode in the reduction-oxidation reaction. Hence, the metal precipitated by the reduction-oxidation reaction is able to be attached to the net 130.

As shown in FIG. 2A, in this embodiment, the redox device 100 further includes a pump 180 connected to the container 110 to collect a gas generated during the electrochemical deposition. In the zinc-air flow battery exemplarily provided in the previous embodiments, metal zinc and oxygen may be generated in the redox device 100, where the oxygen may be collected by the pump 180 and then recycled to the metal-air flow battery 200 for performing a discharging process subsequently. As shown in FIG. 2A, the container 110 is an airtight device and may communicate with the outside through interfaces E1 and E2 and the pump 180, where the interface E1 is configured to receive a fluid F1 flowing from the metal-air flow battery 200, and the fluid F1 includes the electrolyte solution 140 and the product originated from the metal-air flow battery 200 after the discharging reaction; the interface E2 is configured to transmit a fluid F2, and the fluid F2 includes the electrolyte solution 140 and the metal after the reduction-oxidation reaction. A fluid F3 transmitted through the pump 180 includes the gas generated by the redox device 100.

It should also be mentioned that each of the redox device 100, the storage bucket 300, and the metal-air flow battery 200 shown in FIG. 1 is an airtight device, and thus the electrolyte solution 140 may be transformed into a circulating fluid among the redox device 100, the storage bucket 300, and the metal-air flow battery 200 by means of a negative voltage, which is conducive to the transfer of the metal oxide and the metal.

In other embodiments, the redox device 100 is merely connected to the storage bucket 300, or the redox device 100 is merely connected to the metal-air flow battery 200; due to the airtight nature of these devices, the negative voltage may still serve as a driving means of the electrolyte solution 140.

To sum up, in one or more embodiments of the disclosure as provided above, the rod, the container, and the net are correspondingly disposed in the redox device, and the power supply supplies power to the container and the rod to form the electric loop via the electrolyte solution. Thereby, the electrolyte solution containing the product originated from the metal-air flow battery in the container may be applied to perform the reduction-oxidation reaction, and the metal may be electrochemically deposited on the net. Here, the net surrounding the rod gradually moves away from the rod in a spiral manner, and thus the rod acting as a conductive buffer may ensure the passage of the maximum current, so as to effectively increase the contact area between the net and the electrolyte solution and to increase the quantity of the resultant metal that is precipitated after the reduction-oxidation reaction and attached to the net.

Furthermore, during the electrochemical deposition, an ultrasonic module is provided to the container for vibration, so that the metal particles deposited on the net may be immediately shake off and suspended in the electrolyte solution, this move is matched with the relevant parameters of the control module control power supply and the ultrasonic module, so that the particle size of the metal shaken off can be controlled, so that it can be smoothly suspended in the electrolyte solution (avoiding precipitation) to facilitate subsequent transmission. Operation.

In addition, redox device can be connected with storage bucket or metal-air flow battery, and because they are both airtight devices, hence via negative voltage, the electrolyte solution can flow smoothly between them, and then can be connected between redox device and metal-air flow battery A circulating fluid is formed between them. At the same time, the gas generated by the redox device can also be recycled to the metal-air flow battery for use in discharging, hence improving the operating efficiency of the metal-air flow battery.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A redox device of a metal-air flow battery, configured to reduce a product of the metal-air flow battery to metal and comprising:
    a container, having electrical conductivity;
    a rod, having electrical conductivity, inserted into the container, and electrically insulated from the container;
    a net, having electrical conductivity, connected to the rod, and separated from the container, wherein the net surrounding the rod gradually moves away from the rod in a spiral manner, the container receives an electrolyte solution containing the product originated from the metal-air flow battery, and the net is immersed in the electrolyte solution;
    a power supply, electrically connected to the rod, the net, and the container to form an electric loop via the electrolyte solution, wherein the container is connected to a negative electrode of the power supply, and the rod is connected to a positive electrode of the power supply; and
    an ultrasonic module, connected to the container and providing an ultrasonic vibration to the container, wherein the power supply provides a pulse current to the electric loop, so that the metal is electrochemically deposited from the electrolyte solution containing the product on the net, and during the electrochemical deposition, the metal is shaken off from the net via the ultrasonic vibration and suspended in the electrolyte solution.

2. The redox device of the metal-air flow battery according to claim 1, wherein the net covers a surface of the rod.

3. The redox device of the metal-air flow battery according to claim 1, wherein a material of the rod comprises an electrical conductor.

4. The redox device of the metal-air flow battery according to claim 1, wherein a material of the net comprises a corrosion-resistant flexible electrical conductor.

5. The redox device of the metal-air flow battery according to claim 1, further comprising a control module electrically connected to the power supply and the ultrasonic module.

6. The redox device of the metal-air flow battery according to claim 5, wherein the control module controls the ultrasonic module to be intermittently turned on and off.

7. The redox device of the metal-air flow battery according to claim 1, further comprising a pump connected to the container to collect a gas generated during the electrochemical deposition.

8. The redox device of the metal-air flow battery according to claim 1, wherein a concentration of the electrolyte solution is less than 50 wt %, and a temperature of the electrolyte solution is lower than 50° C.

9. The redox device of the metal-air flow battery according to claim 1, configured to connect the metal-air flow battery to form a charging/discharging system, collecting the electrolyte solution containing the product from the metal-air flow battery after a discharging reaction, and generating the metal via the electrochemical deposition and suspending the metal in the electrolyte solution, so that the suspended metal is transferred back to the metal-air flow battery together with the electrolyte solution.

10. The redox device of the metal-air flow battery according to claim 9, further comprising a storage bucket connected between the metal-air flow battery and the redox device.

11. The redox device of the metal-air flow battery according to claim 9, wherein the redox device and the metal-air flow battery are airtight devices, so as to transform the electrolyte solution into a circulating fluid via a negative voltage.

* * * * *